(12) United States Patent
Hennessey et al.

(10) Patent No.: US 12,479,513 B2
(45) Date of Patent: *Nov. 25, 2025

(54) VEHICLE STRUCTURAL ASSEMBLY HAVING STRUT CAPS

(71) Applicant: Ford Global Technologies, LLC, Dearborn, MI (US)

(72) Inventors: Conor Daniel Hennessey, South Hadley, MA (US); Vladimir Vladimirovich Bogachuk, West Bloomfield, MI (US); Ari Garo Caliskan, Canton, MI (US); Musheeruddin Zubair Syed, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/987,081

(22) Filed: Dec. 19, 2024

(65) Prior Publication Data

US 2025/0282426 A1    Sep. 11, 2025

Related U.S. Application Data

(63) Continuation of application No. 18/599,541, filed on Mar. 8, 2024, now Pat. No. 12,187,345.

(51) Int. Cl.
*B62D 25/08* (2006.01)
*B62D 21/11* (2006.01)

(52) U.S. Cl.
CPC ............ *B62D 25/088* (2013.01); *B62D 21/11* (2013.01)

(58) Field of Classification Search
CPC .............................. B62D 25/088; B62D 21/11
See application file for complete search history.

(56) References Cited

U.S. PATENT DOCUMENTS

| 9,616,937 | B2 * | 4/2017 | Sasaki | B62D 29/00 |
| 12,187,345 | B1 * | 1/2025 | Hennessey | B62D 25/088 |

FOREIGN PATENT DOCUMENTS

| CN | 111376982 A | * | 7/2020 | B60R 19/34 |
| CN | 105952838 B | * | 12/2020 | B22D 17/00 |
| DE | 102014104838 A1 | * | 10/2015 | B62D 25/088 |
| DE | 102015008728 A1 | * | 1/2017 | B62D 25/08 |

\* cited by examiner

*Primary Examiner* — Faye M Fleming
(74) *Attorney, Agent, or Firm* — Burris Law, PLLC

(57) ABSTRACT

A structural assembly for a vehicle that includes a main body, a left apron, a right apron, a left strut cap, and a right strut cap. The left apron is fixed to a left upper rail and defines a first opening extending therethrough. The right apron is fixed to a right upper rail and defines a second opening extending therethrough. The left strut cap is secured to the left apron such that the left strut cap covers the first opening. The right strut cap is secured to the right apron such that the right strut cap covers the second opening.

20 Claims, 8 Drawing Sheets

VEHICLE STRUCTURAL ASSEMBLY HAVING STRUT CAPS

CROSS-REFERENCE TO RELATED APPLICATION

This application is a continuation of and claims the benefit of U.S. application Ser. No. 18/599,541, filed Mar. 8, 2024, and titled "VEHICLE STRUCTURAL ASSEMBLY HAVING STRUT CAPS," the content of which is incorporated herein by reference in its entirety.

FIELD

The present disclosure relates to a vehicle structural assembly having strut caps.

BACKGROUND

The statements in this section merely provide background information related to the present disclosure and may not constitute prior art.

Vehicle structures may be manufactured by a casting process including filling molten or semisolid material into a mold and then hardening the material into a shape defined by the mold. The vehicle structure manufactured by the casting process may be secured to other components or parts of the vehicle. The present disclosure addresses manufacturing a vehicle structure by a casting process that is secured to other components of the vehicle.

SUMMARY

This section provides a general summary of the disclosure and is not a comprehensive disclosure of its full scope or all of its features.

In one form, the present disclosure provides a structural assembly for a vehicle that includes a main body, a left apron, a right apron, a left strut cap, and a right strut cap. The main body includes a left upper rail and a right upper rail. The left apron is fixed to the left upper rail and defines a first opening extending therethrough. The right apron is fixed to the right upper rail and defines a second opening extending therethrough. The left strut cap is configured to receive a left strut of a vehicle suspension system and is secured to the left apron such that the left strut cap covers the first opening. The right strut cap is configured to receive a right strut of the vehicle suspension system and is secured to the right apron such that the right strut cap covers the second opening.

In variations of the structural assembly of the above paragraph, which can be implemented individually or in any combination: the main body further includes a left lower rail and a right lower rail; the left strut cap is positioned between the left upper rail and the left lower rail, the right strut cap is positioned between the right upper rail and the right lower rail; the left lower rail is located further outboard than the left upper rail, the right lower rail is located further outboard than the right upper rail; the left strut cap includes a first flange that is secured to the left upper rail, the right strut cap includes a second flange that is secured to the right upper rail; the left strut cap includes a first interface portion that is configured to engage the left strut and a first body portion extending downward from the first interface portion and secured to the left mounting feature, the first flange extending from the first body portion; the right strut cap includes a second interface portion that is configured to engage the right strut and a second body portion extending downward from the second interface portion and secured to the right mounting feature, the second flange extending from the second body portion; the left strut cap includes a first interface portion that is configured to engage the left strut and a first body portion extending downward from the first interface portion and secured to the left mounting feature; the right strut cap includes a second interface portion that is configured to engage the right strut and a second body portion extending downward from the second interface portion and secured to the right mounting feature; the first interface portion is above the left upper rail and the second interface portion is above the right upper rail; the left mounting feature is a left flange extending upward from the first periphery of the first opening, the right mounting feature is a right flange extending upward from the second periphery of the second opening; the left strut engaging the left strut cap and the right strut engaging the right strut cap; the left upper rail includes a first end proximate a rear end of the main body and a second end proximate a front end of the main body, the left upper rail being a continuous structure from the first end to the second end; and the right upper rail includes a third end proximate the rear end of the main body and a fourth end proximate the front end of the main body, the right upper rail being a continuous structure from the third end to the fourth end; and a left mounting feature and a right mounting feature, wherein the left mounting feature extends at least partially around a first periphery of the first opening, the right mounting feature extends at least partially around a second periphery of the second opening.

In another form, the present disclosure provides a structural assembly for a vehicle that includes a main body, a left strut cap, and a right strut cap. The main body includes a left upper rail, a right upper rail, a left apron, and a right apron. The left apron extends from the left upper rail and defines a first opening extending therethrough. The right apron extends from the right upper rail and defines a second opening extending therethrough. The left strut cap is configured to receive a left strut of a vehicle suspension system and is secured to the left upper rail. The right strut cap is configured to receive a right strut of the vehicle suspension system and is secured to the right upper rail. The left strut cap includes a first interface portion that is configured to engage the left strut and the right strut cap includes a second interface portion that is configured to engage the right strut. The first interface portion is located above the left upper rail and the second interface portion is located above the right upper rail.

In variations of the structural assembly of the above paragraph, which can be implemented individually or in any combination: the main body further includes a left lower rail and a right lower rail, the left apron extends from the left upper rail to the left lower rail and the right apron extends from the right upper rail to the right lower rail; the left strut cap is positioned between the left upper rail and the left lower rail, the right strut cap is positioned between the right upper rail and the right lower rail; the left strut cap includes a first attachment flange that is secured to the left upper rail, the right strut cap includes a second attachment flange that is secured to the right upper rail; the left strut cap includes a first body portion extending downward from the first interface portion, the first attachment flange extending from the first body portion; the right strut cap includes a second body portion extending downward from the second interface portion, the second attachment flange extending from the second body portion; the left upper rail includes a first end proximate a rear end of the main body and a second end proximate a front end of the main body, the left upper rail being a continuous structure from the first end to the second end; the right upper rail includes a third end proximate the rear end of the main body and a fourth end proximate the front end of the main body, the right upper rail being a continuous structure from the third end to the fourth end; further comprising a left mounting flange extends at least partially around a first periphery of the first opening and extends upward from the first periphery of the first opening; a right mounting flange extends at least partially around a second periphery of the second opening and extends upward from the second periphery of the second opening.

A method of forming a structural assembly for a vehicle. The method including forming a main body that includes a left upper rail, a right upper rail, a left apron and a right apron, the left apron extends from the left upper rail and the right apron extends from the right upper rail; forming a first opening in the left apron and a second opening in the right apron; securing a left strut cap to the left upper rail such that the left strut cap covers the first opening; and securing a right strut cap to the right upper rail such that the right strut cap covers the second opening.

In variations of the method of the above paragraph, which can be implemented individually or in any combination: securing a left strut to the left strut cap and securing a right strut to the right strut cap; and the left strut cap is further secured to the left upper rail and the right strut cap is further secured to the right upper rail.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
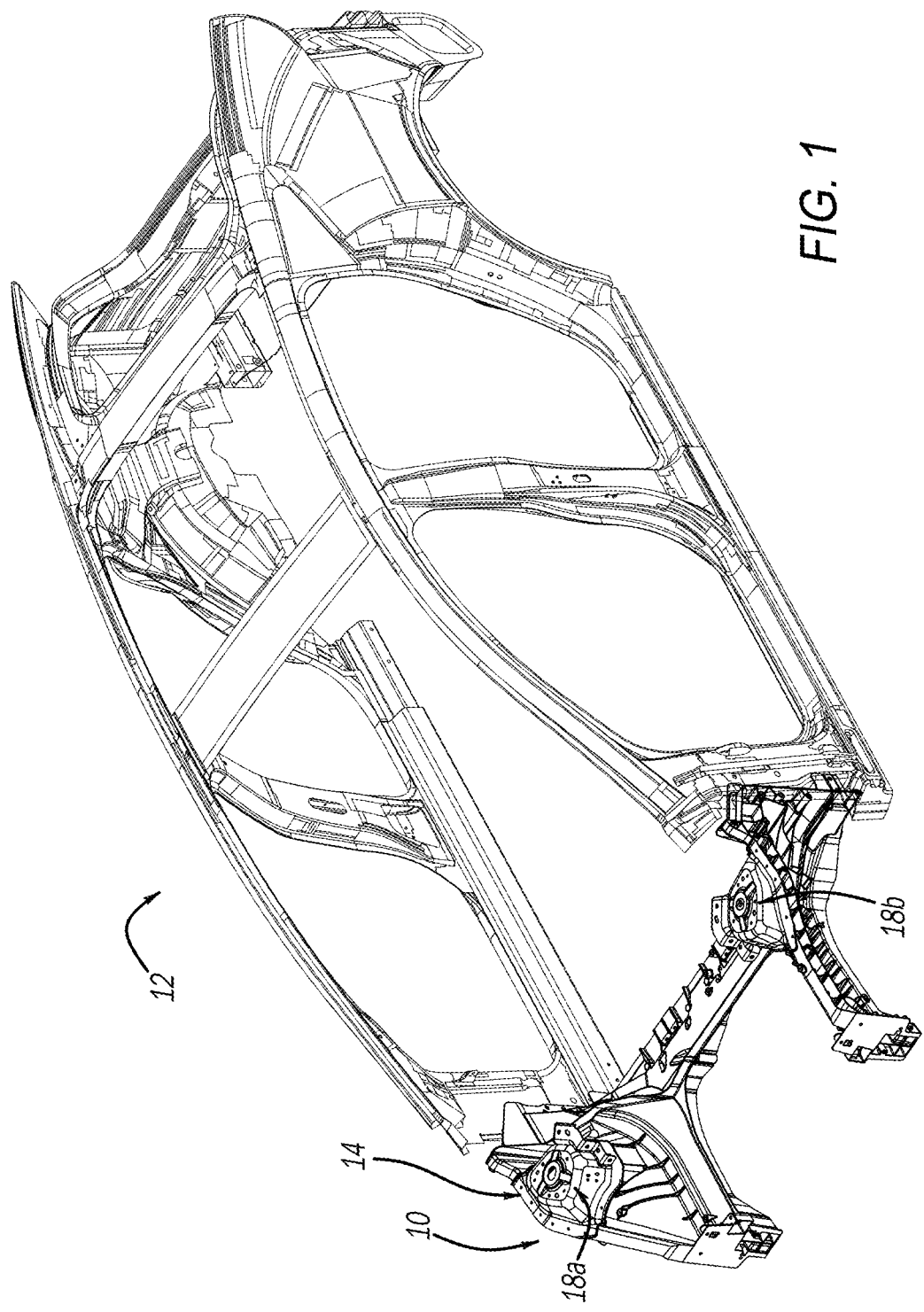
FIG. 1 is a perspective view of a portion of a vehicle body including a structural assembly according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a vehicle 12 including a structural assembly 10 is provided. In the example illustrated, the vehicle 12 is of a uni-body construction. In some forms, the vehicle 12 may be a body-on-frame architecture. In some forms, the vehicle 12 can be an electric vehicle. In other forms, the vehicle 12 can have an internal combustion engine (ICE). Still, in other forms, the vehicle 12 can be a hybrid electric vehicle (HEV). The structural assembly 10 according to the present disclosure includes a casting or cast main body 14 and a pair of strut caps 18a, 18b secured to the casting 14 as described in more detail below.

A "casting" 14 as used herein is a product that is manufactured by a casting process, i.e., by filling molten or semisolid material into a mold and then hardening the material into a shape defined by the mold. The casting 14 includes a plurality of structural components joined together in the casting process. The plurality of structural components form structural load paths and extend in a plurality of directions in a 3D space. That is, the casting process providing the casting 14 with modes of deformation and energy absorption throughout 3D space that absorbs energy more readily than forming each component separately and joining them later. By forming the casting 14 with the casting process, the casting 14 increases uniformity of energy absorption characteristics throughout the structural components and reduces overall weight of portions of the structural assembly 10. The casting process reduces machining of the structural components upon forming the casting 14.

The casting 14 is formed of a castable-allowable alloy material, i.e., a material that is able to be used in the casting process. As described above, the material used in the casting process is heated to a liquid or semisolid phase and then introduced to the mold to form the casting 14. The cast-allowable alloy material can be, e.g., one of an aluminum alloy, a fiber-reinforced aluminum, a fiber-reinforced magnesium, etc. The cast-allowable alloy material may have a lower weight, ductility, and/or toughness than other materials used in vehicle components. That is, the cast-allowable alloy material may be less ductile and may have a lower toughness than other materials that are not able to be used in the casting process. The lower weight of the cast-allowable alloy reduces overall weight of the vehicle 12.

Figure 2:
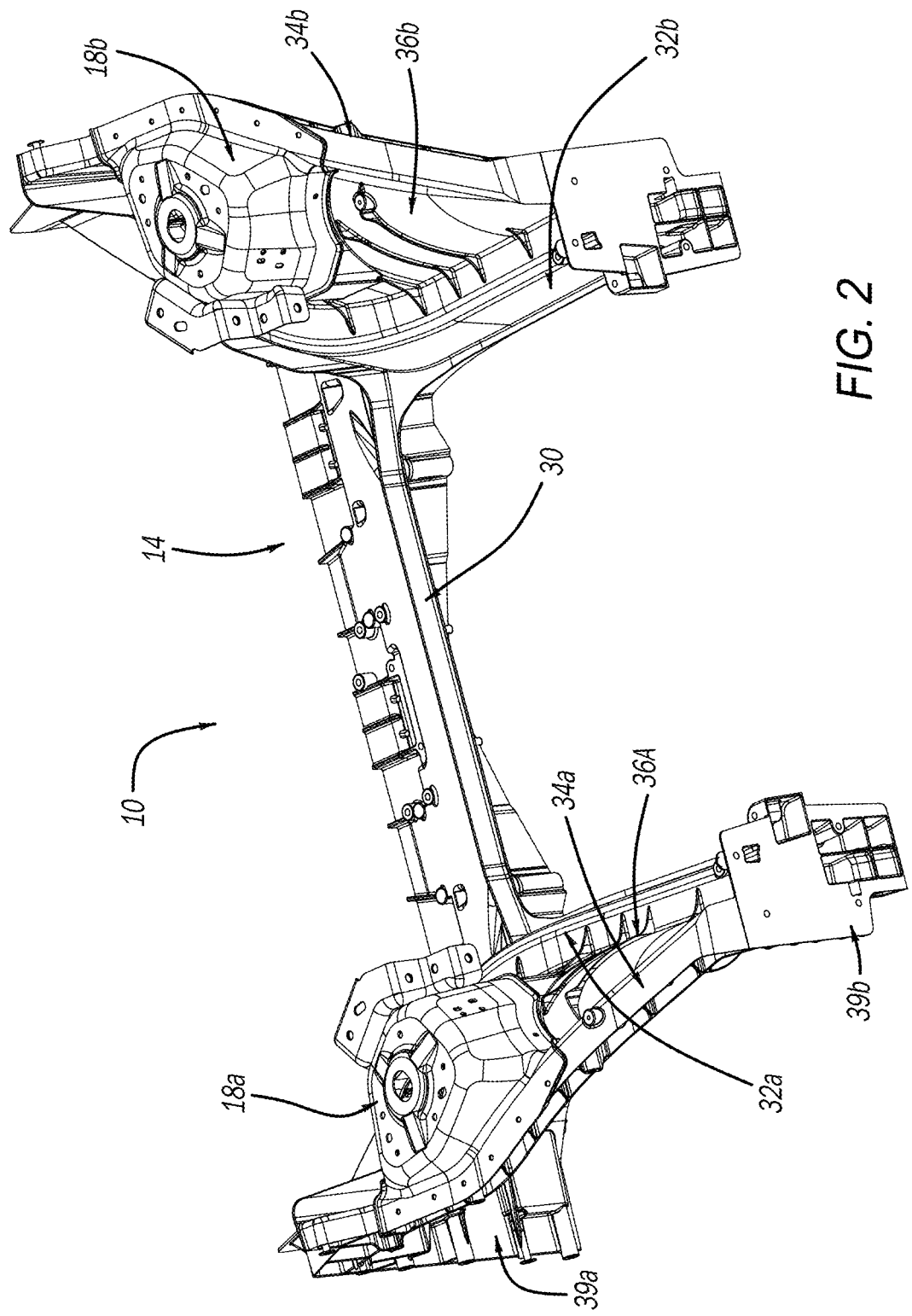
FIG. 2 is a perspective view of the structural assembly of FIG. 1.
Figure 3:
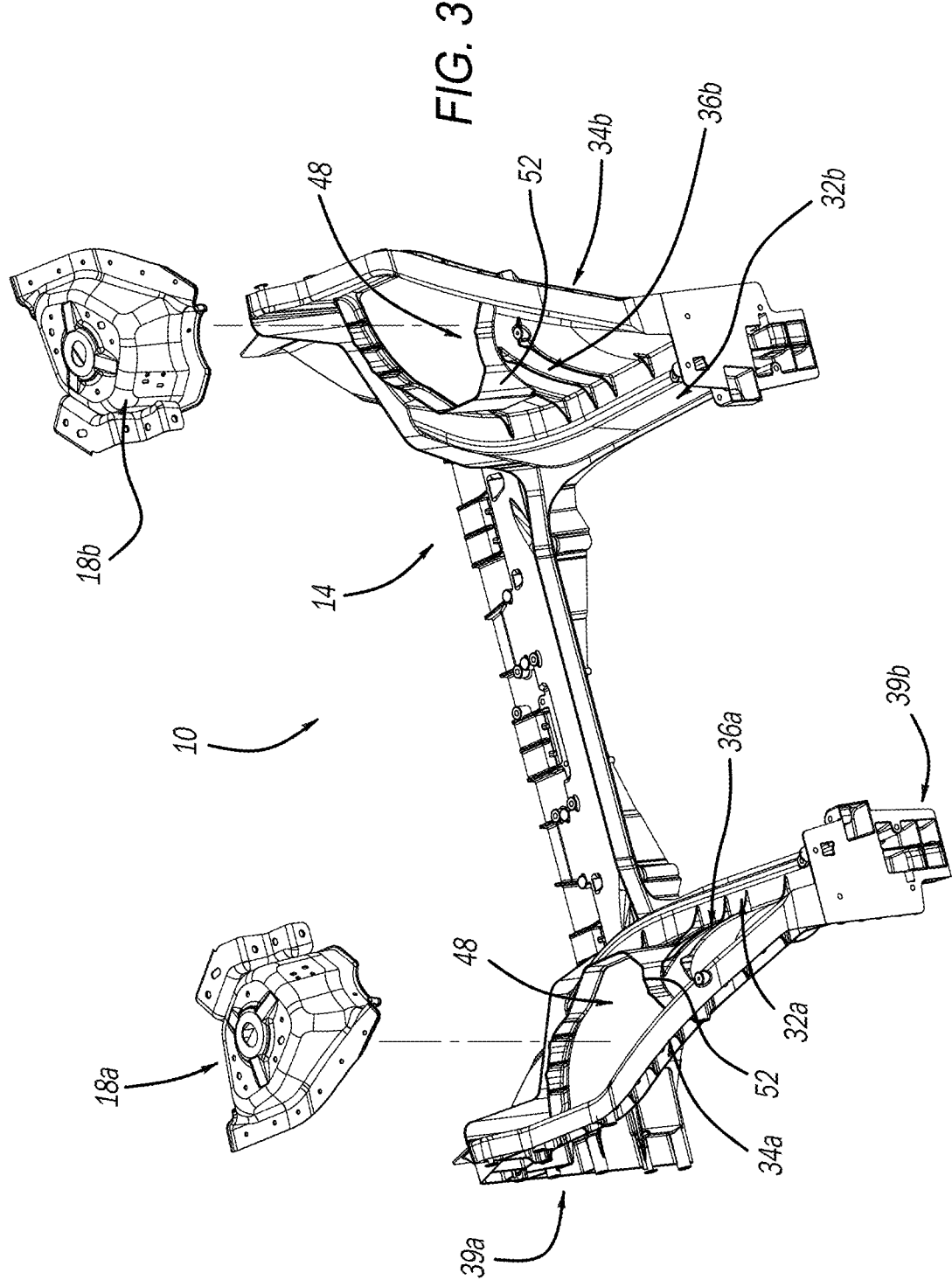
FIG. 3 is an exploded view of the structural assembly of FIG. 1.

Referring to FIGS. 2 and 3, the casting 14 may be of a front end of the vehicle 12 and may be secured to a subframe (not shown) of the vehicle 12 such that the subframe is supported by the casting 14. In the example illustrated, the casting 14 includes a front dash cross member 30, a pair of opposed beams or inner rails 32a, 32b, a pair of opposed upper rails 34a, 34b, and a pair of opposed aprons 36a, 36b. A bumper (not shown) extends in a transverse direction relative to a longitudinal direction of the vehicle 12 and is secured to front ends of the pair of beams 32a, 32b. The front dash cross member 30 extends in the transverse direction at a rear end 39a of the casting 14 and connects to the mid inner rails 32a, 32b and a subframe (not shown). Each beam 32a, 32b extends from a lower portion of a respective hinge pillar to the bumper. Each beam 32a, 32b is also arcuate and extends around a front wheel (not shown) of the vehicle 12 and forms a portion of a respective front wheel well. The upper rails 34a, 34b are positioned above the beams 32a, 32b and extend from an upper portion of a respective hinge pillar to a front end of a respective beam 32a, 32b. Stated differently, each upper rail 34a, 34b includes a first end 42a located at the upper portion of the respective hinge pillar and a second end 42b located at the front end of the respective beam 32a, 32b. It should be understood that each upper rail 34a, 34b has a continuous structure from the first end 42a to the second end 42b.

Figure 4:
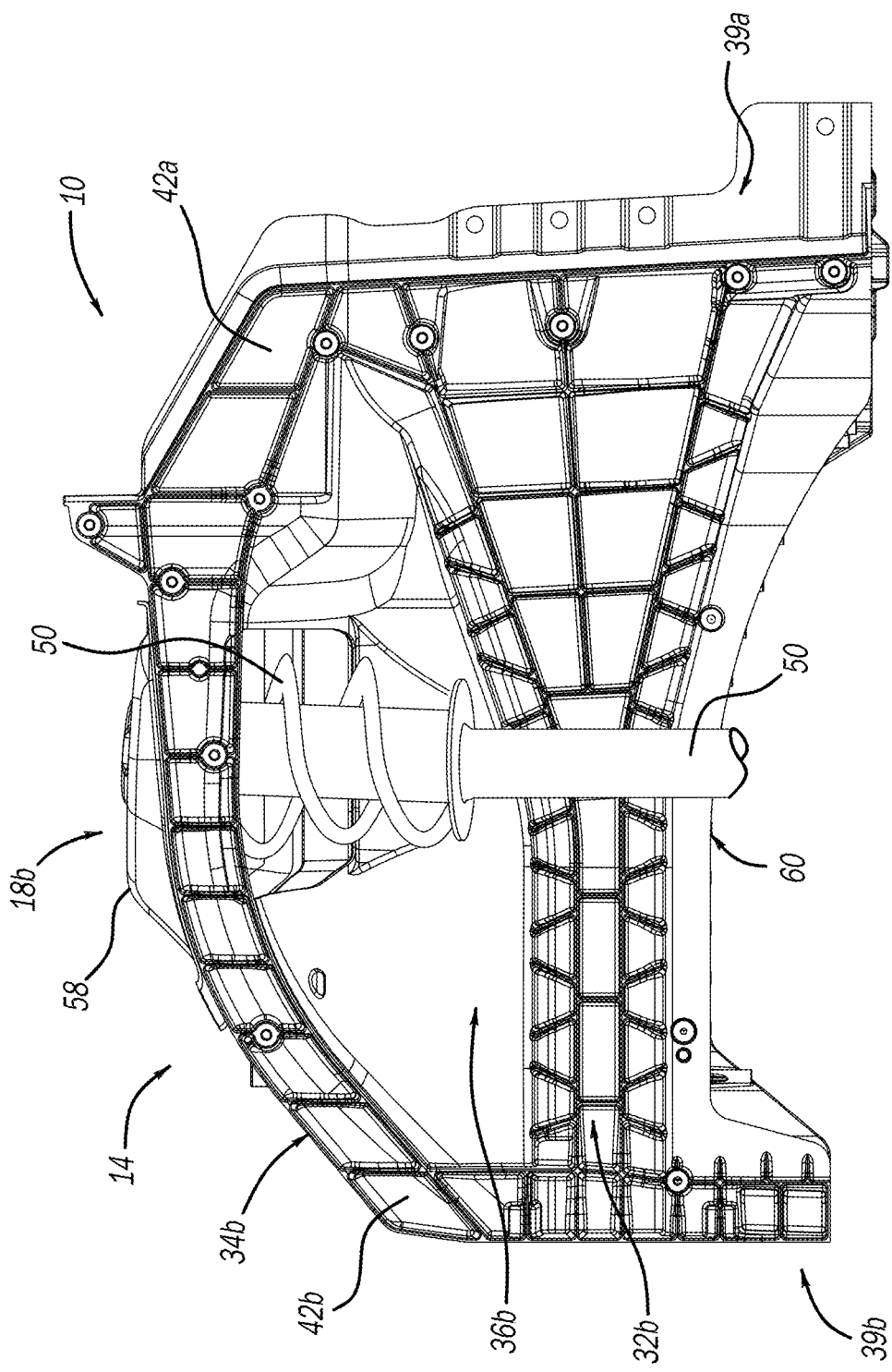
FIG. 4 is a side view of the structural assembly of FIG. 1.
Figure 5:
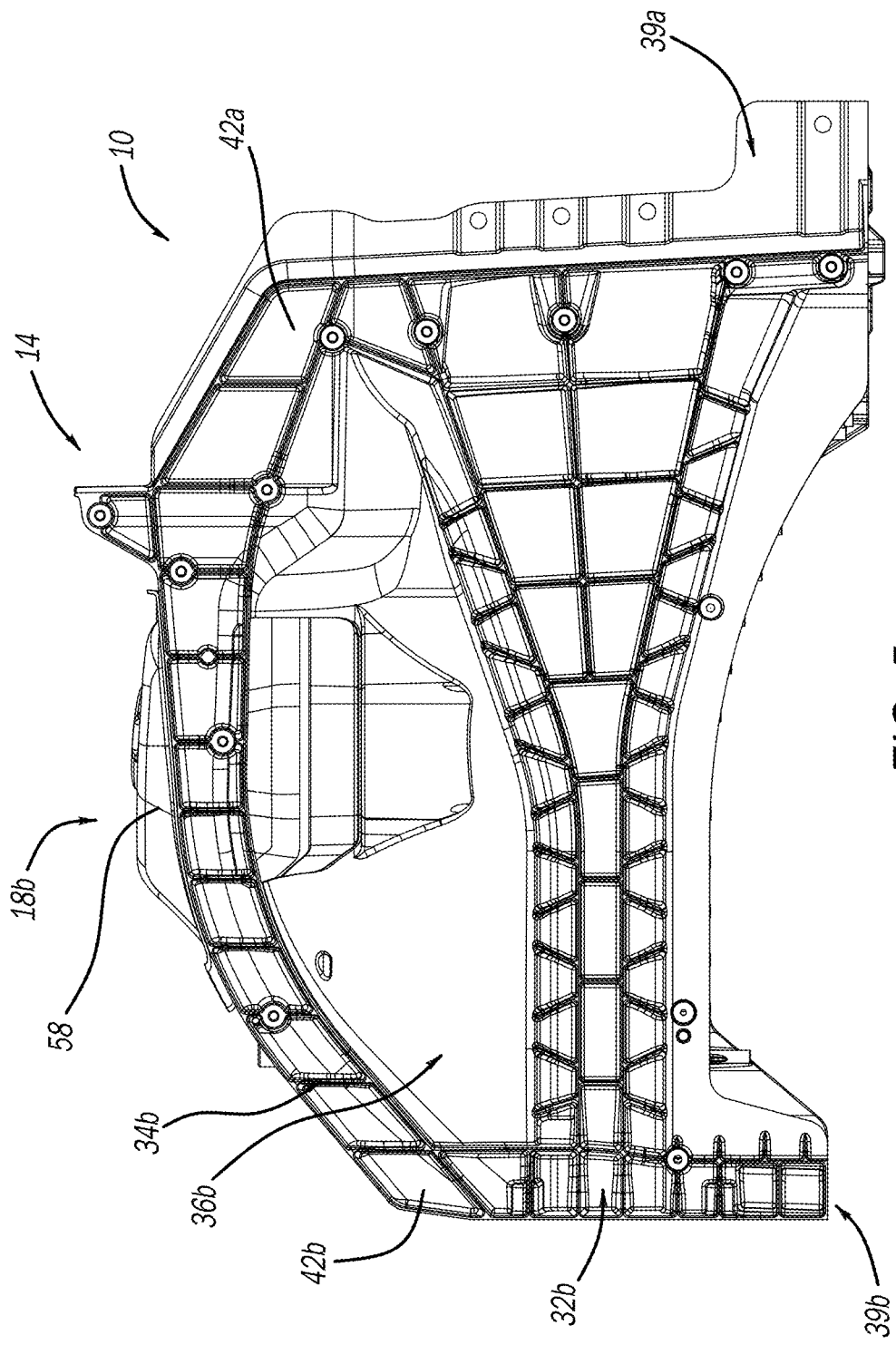
FIG. 5 is a side view of the structural assembly of FIG. 1 with suspension components removed for clarity.

With reference to FIGS. 2-4, each apron 36a, 36b is arcuate and extends from a respective upper rail 34a, 34b to a respective beam 32a, 32b. Stated differently, each apron 36a, 36b extends from a lower, inboard side of the respective upper rail 34a, 34b to an upper, outboard side of the respective beam 32a, 32b. In this way, each apron 36a, 36b is located between the respective upper rail 34a, 34b and the respective beam 32a, 32b. Each apron 36a, 36b also extends from the rear end 39a of the casting 14 to a front end 39b of the casting 14 and includes an opening 48 (FIG. 3) formed therein. That is, the opening 48 (FIG. 3) extends through each apron 36a, 36b such that one or more components 50 (FIG. 4) of the vehicle suspension system 60 may extend through (or pass through) the opening 48. In the example illustrated, the opening 48 formed in the apron 36a, 36b is located closer toward a respective upper rail 34a, 34b than a respective beam 32a, 32b. In some forms, the opening 48 formed in the apron 36a, 36b may be located closer toward the respective beam 32a, 32b than the respective upper rail 34a, 34b. In other forms, the opening 48 formed in the apron 36a, 36b may be located at a midpoint between the respective beam 32a, 32b and the respective upper rail 34a, 34b. In the example illustrated, each apron 36a, 36b includes a mounting feature or flange 52 (FIG. 3) that permits the strut caps 18a, 18b to be mounted to the casting 14, which will be described in more detail below. In the example illustrated, the mounting feature 52 extends upward from the apron 36a, 36b and extends at least partially around the opening 48 in the apron 36a, 36b.

Each strut cap 18a, 18b is secured to the mounting feature 52 of a respective apron 36a, 36b of the casting 14 and stores at least a portion of the vehicle suspension system 60. The vehicle suspension system 60 provides a smooth ride by absorbing energy from various road bumps while driving. The vehicle suspension system 60 includes various components such as control arms, springs, shock absorbers, struts, and ball joints, for example. In the example illustrated, each strut cap 18a, 18b is secured to the mounting feature 52 such that the strut cap 18a, 18b covers the opening 48. Each strut cap 18a, 18b may be secured to the mounting feature 52 by welding, mechanical fasteners and/or any other suitable attachment means.

Figure 6A:
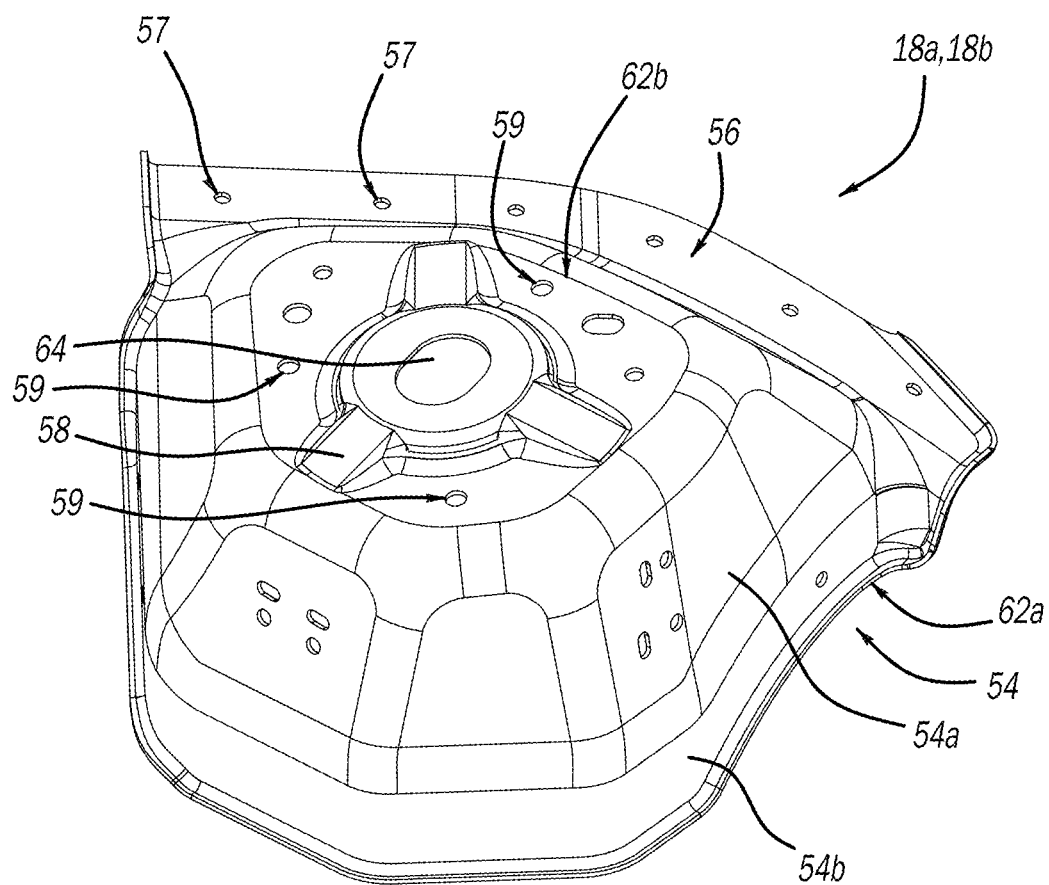
FIG. 6A is a top perspective view of one strut cap of the structural assembly of FIG. 1.
Figure 6B:
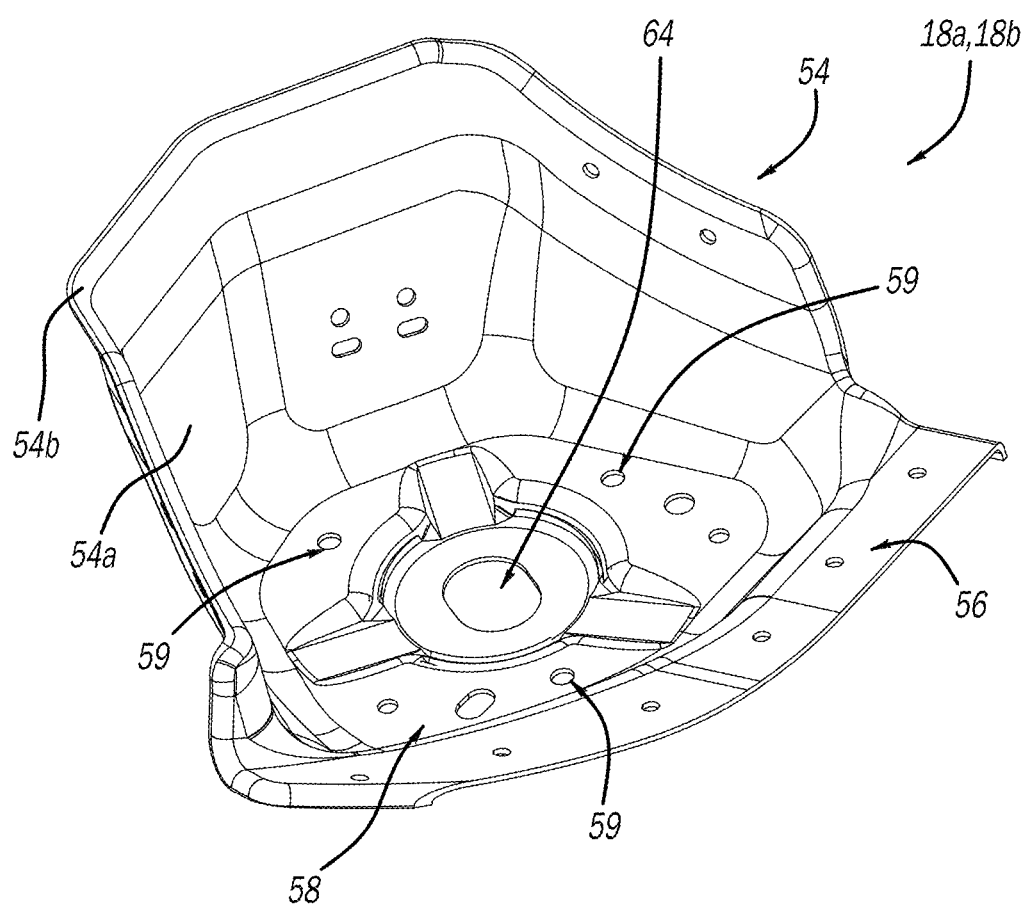
FIG. 6B is a bottom perspective view of one strut cap of the structural assembly of FIG. 1.

With reference to FIGS. 4, 5, 6A, and 6B, each strut cap 18a, 18b may be manufactured using a stamping process or a casting process, for example. As shown in FIGS. 6A and 6B, each strut cap 18a, 18b includes a body portion 54, a flange 56, and an interface portion 58. In the example illustrated, the body portion 54 extends around an entire periphery of the interface portion 58. In some forms, the body portion 54 extends at least partially around the periphery of the interface portion 58. The body portion 54 includes an angled section 54a and a mounting section 54b. The angled section 54a extends downward and outward from the interface portion 58 to the mounting section 54b. In one form, the mounting section 54b may be oriented or otherwise extend vertically. In others forms, the mounting section 54b may be angled. The mounting section 54b extends downward from the angled section 54a and is secured to the mounting feature 52. The mounting section 54b is located proximate a lower end 62a of the body portion 54 (i.e., the lower end 62a of the body portion 54 is proximate the mounting feature 52) and has an area that is greater than an area of an upper end 62b of the body portion 54 (i.e., the upper end 62b of the body portion 54 is extends from the interface portion 58).

The flange 56 extends from the body portion 54 and is secured to the upper rail 34a, 34b of the casting 14 by welding, mechanical fasteners, and/or any other suitable attachment means. In the example illustrated, the flange 56 extends at least partially around the mounting section 54b of the body portion 54. In some forms, the flange 56 may extend from the angled section 54a of the body portion 54 and may be secured to the upper rail 34a, 34b of the casting 14. In the example illustrated, the flange 56 has a predetermined shape (e.g., L-shape) that corresponds to a portion of the upper rail 34a, 34b. In this way, the strut cap 18a, 18b is also secured to the upper rail 34a, 34b and extends along a portion of the length of the upper rail 34a, 34b. In one form, the flange 56 may include apertures 57 extending therethrough for securement of the flange 56 to the upper rail 34a, 34b.

The interface portion 58 is positioned above the upper rail 34a, 34b (FIGS. 4 and 5) and is configured to engage the components 50 of the vehicle suspension system 60. The interface portion 58 includes an aperture 64 extending therethrough. In this way, a portion of the component 50 may extend through the aperture 64. In the example illustrated, the aperture 64 is located near or at a central area of the interface portion 58. Apertures 59 may be formed in the body portion 54 and/or the interface portion 58 and may include a circular or oval shape. The apertures 59 may have a diameter that is smaller than a diameter of aperture 64. The apertures 59 may facilitate securement of the strut cap 18a, 18b to the casting 14 and/or the component 50 of the suspension system 60.

In the example illustrated, the component 50 is a McPherson Strut, which is secured to a wheel hub (not shown) at a first end and secured to a respective strut cap 18a, 18b at a second end. For example, each strut cap 18a, 18b can house a strut of the vehicle suspension system.

Figure 7:
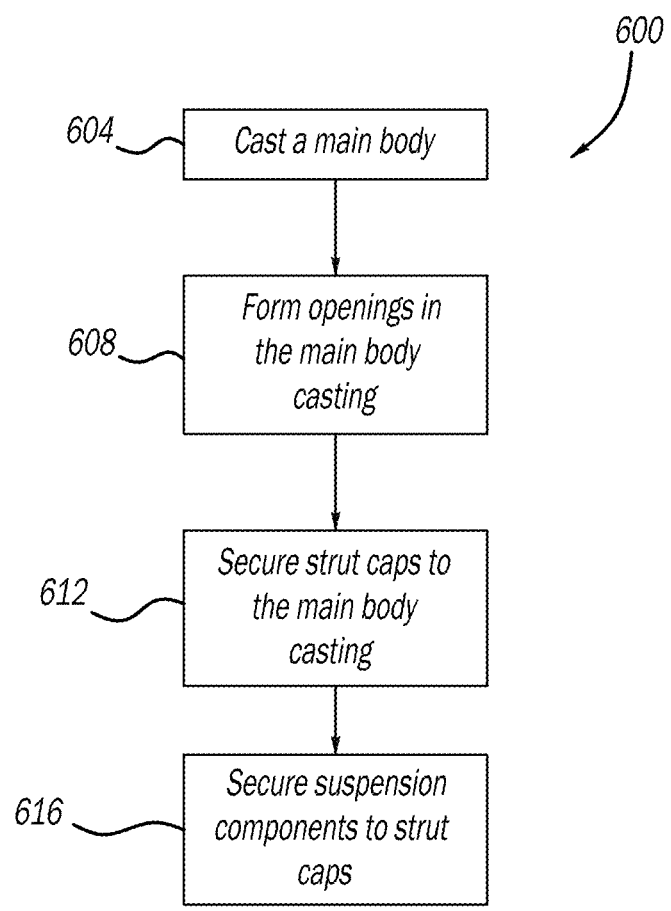
FIG. 7 is a flow chart depicting a method for manufacturing the structural assembly of FIG. 1.

With reference to FIG. 7, manufacturing the structural assembly 10 of the present disclosure is disclosed. At 604, the casting 14 is manufactured, which includes the front dash cross member 30, the pair of opposed beams or inner rails 32a, 32b, the pair of opposed upper rails 34a, 34b, and the pair of opposed aprons 36a, 36b. In some forms, the opposed aprons 36a, 36b may be manufacturing separately from the casting 14 and secured to the casting 14. In one form, the opposed aprons 36a, 36b may be manufactured by a stamping process then secured to the casting 14. At 604, openings 48 are formed in the aprons 36a, 36b. In one form, the casting 14 is trimmed or cut to form the openings 48 in the aprons 36a, 36b. In another form, the casting 14 is manufactured to include the openings 48 therein. At 612, the strut caps 18a, 18b are secured to the casting 14 using welding, mechanical fasteners, or any other suitable attachment means. It should be understood that the strut caps 18a, 18b are manufactured separately from the casting 14 and are secured to the casting 14. In one example, the strut caps 18a, 18b are manufacturing by a stamping process. In another form, the opposed aprons 36a, 36b may be manufactured as a separate casting with the strut caps and secured to the casting 14. At 616, the components 50 of the suspension system 60 are secured to the strut caps 18a, 18b.

The structural assembly 10 of the present disclosure provides a front-end architecture that includes strut caps 18a, 18b manufactured separately from the casting 14 and secured to the casting 14. In some forms, the structural assembly 10 of the present disclosure provides a front-end architecture that includes strut caps 18a, 18b and opposed aprons 36a, 36b manufactured separately from the casting 14 and joined to the casting 14. In this way, the front-end architecture may be employed with a MacPherson strut suspension, for example, without casting issues. That is, employing the height of the MacPherson strut suspension in a single cast component that includes the strut caps and opposed aprons may introduce casting feasibility issues where portions of the shock to structure interface would be die-locked behind the opposed upper rails. Manufacturing the strut caps separately from the main casting and joining them using a separate process provides a solution to the shock to structure interface being die-locked.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for a vehicle comprising:
a main body including a left upper rail and a right upper rail;
a left apron and a right apron, wherein the left apron is fixed to the left upper rail and defines a first opening extending therethrough, the right apron is fixed to the right upper rail and defines a second opening extending therethrough; and
a left strut cap and a right strut cap, wherein the left strut cap is configured to receive a left strut of a vehicle suspension system and is secured to the left apron such that the left strut cap covers the first opening, wherein the right strut cap is configured to receive a right strut of the vehicle suspension system and is secured to the right apron such that the right strut cap covers the second opening.

2. The structural assembly of claim 1, wherein the main body further includes a left lower rail and a right lower rail.

3. The structural assembly of claim 2, wherein the left strut cap is positioned between the left upper rail and the left lower rail, and wherein the right strut cap is positioned between the right upper rail and the right lower rail.

4. The structural assembly of claim 2, wherein the left lower rail is located further outboard than the left upper rail, and wherein the right lower rail is located further outboard than the right upper rail.

5. The structural assembly of claim 1, wherein the left strut cap includes a first flange that is secured to the left upper rail, and wherein the right strut cap includes a second flange that is secured to the right upper rail.

6. The structural assembly of claim 5, wherein:
the left strut cap includes a first interface portion that is configured to engage the left strut and a first body portion extending downward from the first interface portion, the first flange extending from the first body portion; and
the right strut cap includes a second interface portion that is configured to engage the right strut and a second body portion extending downward from the second interface portion, the second flange extending from the second body portion.

7. The structural assembly of claim 1, wherein:
the left strut cap includes a first interface portion that is configured to engage the left strut and a first body portion extending downward from the first interface portion; and
the right strut cap includes a second interface portion that is configured to engage the right strut and a second body portion extending downward from the second interface portion.

8. The structural assembly of claim 7, wherein the first interface portion is above the left upper rail and the second interface portion is above the right upper rail.

9. The structural assembly of claim 1, further comprising a left mounting feature and a right mounting feature, wherein the left mounting feature extends at least partially around a first periphery of the first opening, the right mounting feature extends at least partially around a second periphery of the second opening.

10. The structural assembly of claim 9, wherein the left mounting feature is a left flange extending upward from the first periphery of the first opening, and wherein the right mounting feature is a right flange extending upward from the second periphery of the second opening.

11. The structural assembly of claim 1, wherein:
the left upper rail includes a first end proximate a rear end of the main body and a second end proximate a front end of the main body, the left upper rail being a continuous structure from the first end to the second end; and
the right upper rail includes a third end proximate the rear end of the main body and a fourth end proximate the front end of the main body, the right upper rail being a continuous structure from the third end to the fourth end.

12. A structural assembly for a vehicle comprising:
a main body including:
a left upper rail and a right upper rail;
a left apron and a right apron, wherein the left apron extends from the left upper rail and defines a first opening extending therethrough, the right apron extends from the right upper rail and defines a second opening extending therethrough; and
a left strut cap and a right strut cap, wherein the left strut cap is configured to receive a left strut of a vehicle suspension system and is secured to the left apron, wherein the right strut cap is configured to receive a right strut of the vehicle suspension system and is secured to the right apron,
wherein the left strut cap includes a first interface portion that is configured to engage the left strut and the right strut cap includes a second interface portion that is configured to engage the right strut, the first interface portion is located above the left upper rail and the second interface portion is located above the right upper rail.

13. The structural assembly of claim 12, wherein the main body further includes a left lower rail and a right lower rail, and wherein the left apron extends from the left upper rail to the left lower rail and the right apron extends from the right upper rail to the right lower rail.

14. The structural assembly of claim 13, wherein the left strut cap is positioned between the left upper rail and the left lower rail, and wherein the right strut cap is positioned between the right upper rail and the right lower rail.

15. The structural assembly of claim 12, wherein the left strut cap includes a first attachment flange that is secured to the left upper rail, and wherein the right strut cap includes a second attachment flange that is secured to the right upper rail.

16. The structural assembly of claim 15, wherein:
the left strut cap includes a first body portion extending downward from the first interface portion, the first attachment flange extending from the first body portion; and
the right strut cap includes a second body portion extending downward from the second interface portion, the second attachment flange extending from the second body portion.

17. The structural assembly of claim 12, wherein:
the left upper rail includes a first end proximate a rear end of the main body and a second end proximate a front end of the main body, the left upper rail being a continuous structure from the first end to the second end; and
the right upper rail includes a third end proximate the rear end of the main body and a fourth end proximate the front end of the main body, the right upper rail being a continuous structure from the third end to the fourth end.

18. The structural assembly of claim 12, further comprising a left mounting flange and a right mounting flange, wherein the left mounting flange extends at least partially around a first periphery of the first opening, wherein the right mounting flange extends at least partially around a second periphery of the second opening.

19. A method of forming a structural assembly for a vehicle, the method comprising:
forming a main body that includes a left upper rail, a right upper rail, a left apron and a right apron, wherein the left apron extends from the left upper rail and the right apron extends from the right upper rail;
forming a first opening in the left apron and a second opening in the right apron;
securing a left strut cap to the left upper rail such that the left strut cap covers the first opening; and
securing a right strut cap to the right upper rail such that the right strut cap covers the second opening.

20. The method of claim 18, further comprising securing a left strut to the left strut cap and securing a right strut to the right strut cap.

* * * * *